(12) United States Patent
Tanaka et al.

(10) Patent No.: US 7,727,438 B2
(45) Date of Patent: Jun. 1, 2010

(54) PRODUCTION METHOD OF POLYMER FILM

(75) Inventors: Hiromasa Tanaka, Kanagawa (JP); Koju Ito, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 364 days.

(21) Appl. No.: 11/723,838

(22) Filed: Mar. 22, 2007

(65) Prior Publication Data

US 2007/0222107 A1    Sep. 27, 2007

(30) Foreign Application Priority Data

Mar. 23, 2006    (JP)    ............................ 2006-080359

(51) Int. Cl.
*B32B 33/00*    (2006.01)
(52) U.S. Cl. .............................. 264/173.11; 264/172.19
(58) Field of Classification Search ............ 264/172.19, 264/173.11, 217
See application file for complete search history.

(56) References Cited

U.S. PATENT DOCUMENTS

2005/0077648 A1*    4/2005    Sugiura ...................... 264/216

FOREIGN PATENT DOCUMENTS

| JP | 2001-054936 A | 2/2001 |
|---|---|---|
| JP | 2003-053752 A | 2/2003 |

\* cited by examiner

*Primary Examiner*—Kat Wyrozebski
*Assistant Examiner*—Robert J Grun
(74) *Attorney, Agent, or Firm*—Sughrue Mion, PLLC

(57) ABSTRACT

A primary dope is obtained by mixing a solvent and a polymer, and an additive is added to the primary dope, and thus a second dope for a main layer, a first dope for a contact layer and a third dope for an exposure layer are prepared. Only in the second dope is contained at least one of retardation controller, UV absorbing agent and deterioration inhibitor. The first-third dopes are cast from a casting die onto a casting belt to form a casting film of a three layer structure having the base, contact and exposure layers. Since the volatile compound is contained in the main layer, a precipitation of the volatile compounds on a surface of a produced film is prevented.

9 Claims, 6 Drawing Sheets

PRODUCTION METHOD OF POLYMER FILM

FIELD OF THE INVENTION

The present invention relates to a production method of a polymer film to be used as an optical film which is a main member of a liquid crystal display.

BACKGROUND OF THE INVENTION

A polymer film is often used, for example, as a protective film of a polarizing filter of a liquid crystal display for protecting the polarized film, a wide view film and the like, since having merits in high transparency, high workability, handling easiness, smallness, possibility of miniaturization and the like. Especially, a cellulose acylate film produced by using a cellulose acylate as a polymer is excellent in low cost of raw materials, optical properties (such as wide view angle, high transmittance and the like) and reasonable cost of raw materials. Therefore, attention is focused on the cellulose acylate film with high functions that is produced at low cost.

In order to produce the polymer film, especially the cellulose acylate film, a solution casting method is mainly used. In the solution casting method, a dope is prepared by mixing a polymer (such as cellulose acylate) as the raw material of the film, an organic solvent and the like, and cast thereafter onto a running support to form thereon a casting film containing the solvent. Then the casting film is peeled as a wet film from the support. The wet film, which contains the solvent, is dried to the polymer film.

Generally, plasticizer and an UV absorbing agent and the like are added as additive in the polymer film in order to keep the function of the UV absorbance and increase the brittle strength. However, almost of the additive compounds are volatile compounds having low molecular weights. Therefore, when the casting film and the wet film are dried, not only the organic solvent but also the volatile compounds of the additive evaporate. In the produced film, the effects of the additive become lower. Note that the volatile compound is added as additive which easily evaporates as described above in the film production.

Further, if the film contains the volatile compounds, the volatile compounds deposit on the film surface during storage or in use. Thus the bleeding-out phenomenon occur, which causes the pollution of the film surface and the like. For example, if the polymer film is used as the protective film for the polarizing filter, the adhesiveness of the polarizing filter to the polymer film becomes lower. Therefore, in order to prevent the bleeding-out phenomenon, the Japanese Patent Laid-Open Publication No. 2001-054936 teaches a polymer film and a production method thereof in which surface layers sandwich a main layer, while the content of the plasticizer and the UV absorbing agent is lower in the surface layers than the main layer.

However, the additive (such as the volatile compound and the like), the polymer and the organic solvents are hardly mixed, since there is a difference in compatibility among these compounds. Therefore, it is hard to prepare the dope uniformly. The stirring time is made longer at high rotation speed of a stirrer, which causes the long production time and the high cost. In order to obtain the uniform dope effectively and efficiently, for example, the Japanese Patent Laid-Open Publication No. 2003-053752 teaches a production method of a dope. In this method, the primary dope containing the polymer and the organic solvent is prepared, and then the additive is added to the dope through a nozzle while a circular outlet of the nozzle is disposed in a center of inside of a pipe in which the dope containing the polymer and the organic solvent flows. After the adding, the dope and the additive are mixed by an inline mixer. Further, the conditions of adding and heating, and the pressure of the dope are controlled.

However, in the publication No. 2001-054936, there still remains a possibility of the bleeding-out phenomenon of the plasticizer and the UV absorbing agent that are contained in the surface layers. Further, in the publication No. 2003-053752, the productivity is not high since it takes long time for the additive to spread from a center to an inner face on the tube. If the inline mixer having many elements is used, the productivity becomes higher. However, in this case, the cost becomes higher and the apparatus becomes larger. Further, in the method of adding the additive through the outlet of the nozzle, the additive is not added uniformly, and the uniform dope is hardly obtained.

SUMMARY OF THE INVENTION

An object of the present invention is to provide a production method of a polymer film, in which the volatile compounds are prevented from bleeding out on the film surface.

Another object of the present invention is to provide a production method of a polymer film from a uniform dope prepared by stirring enough a mixture of a polymer, a organic solvent and an additive containing volatile compounds.

In order to achieve the object and the other object, in a production method of a polymer film having exposed surface layers and an intermittent layer between the surface layer of the present invention, a polymer and an organic solvent are mixed such that a primary dope may be prepared, and then additives to be contained in the polymer film is added to the primary dope, such that a casting dope for forming the surface layers and a casting dope for forming the intermittent layer may be obtained, while the additive added to the casting dope for the intermittent layer contains volatile compound. The casting film is peeled as a wet film containing the organic solvent from the support. The wet film is dried such that the polymer film may be obtained.

Preferably, the volatile compound is one of a retardation controller, a UV absorbing agent and a deterioration inhibitor.

Preferably, the primary dope is fed in a pipe, and the additive is added to the primary dope through a tube connecting to the pipe. The primary dope and the additive are mixed by a static mixer provided in the pipe. Particularly preferably, the tube includes a slit as outlet extending in an inner diameter direction of the pipe. Especially preferably, a length of the slit is in the range of 20% to 80% of an inner diameter of the pipe. Further, especially preferably, a clearance C of the slit is at least 0.1 mm and at most one tenth of an inner diameter of the pipe. Especially preferably, furthermore, a distance D from the slit to the inline mixer is in the range of 1 mm to 250 mm. Further, a current speed V1 of the additive flowing in the tube and a current speed V2 of the primary dope flowing in the pipe satisfy a condition, $1 \leq V1/V2 \leq 5$.

Preferably, the casting is a co-casting or a sequential casting.

According to the present invention, the bleeding-out phenomena of the volatile compound on the film surface is prevented in the film production. Further, the stirring of the polymer, the organic solvent, and the additive, such as the volatile compound and the like, such that the prepared dope may be uniform. Since such a dope is used, the produced film has optical properties and is excellent in transparency.

BRIEF DESCRIPTION OF THE DRAWINGS

The above objects and advantages of the present invention will become easily understood by one of ordinary skill in the art when the following detailed description would be read in connection with the accompanying drawings.

DESCRIPTION OF THE PREFERRED EMBODIMENTS

Figure 1:
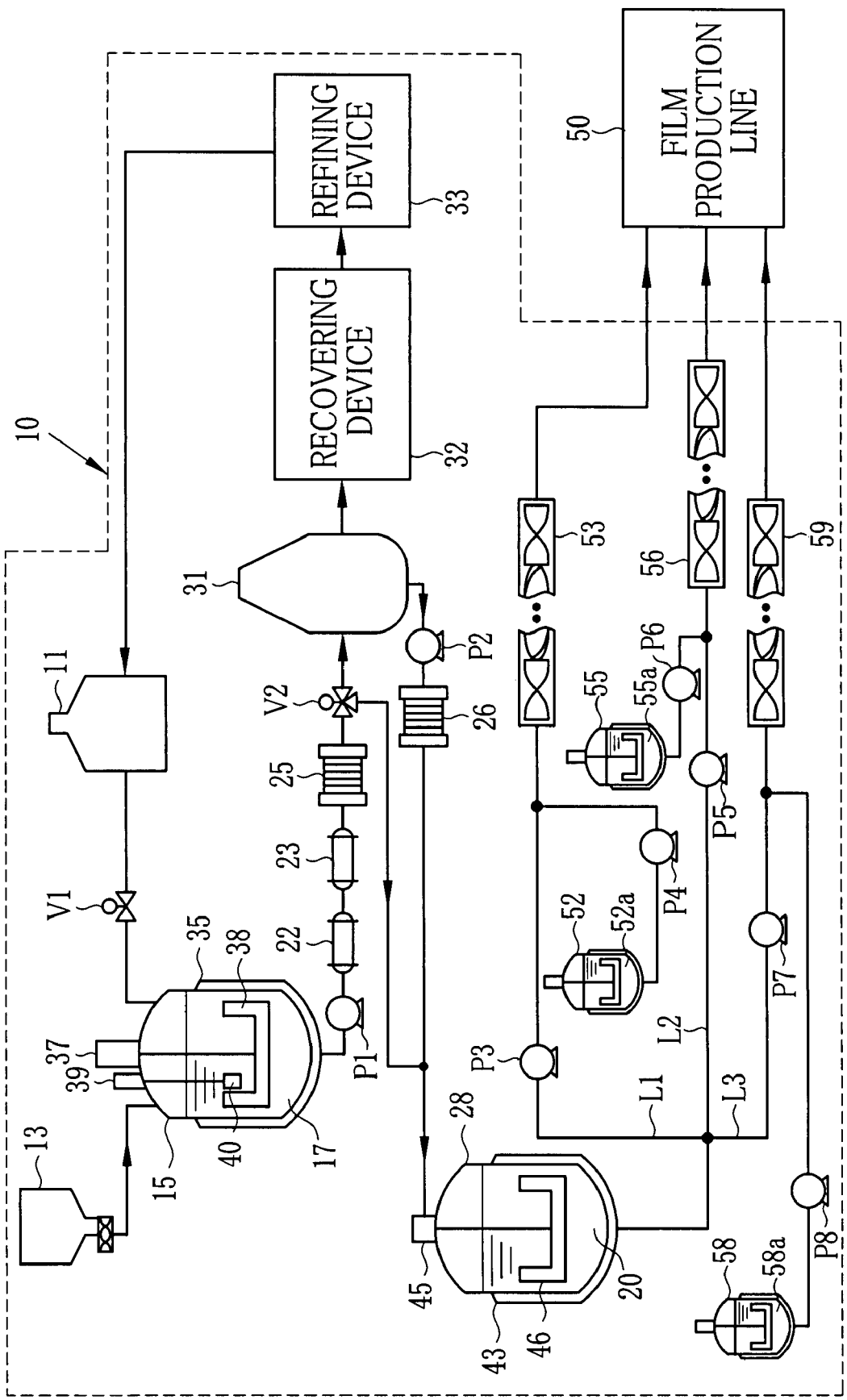
FIG. 1 is a schematic diagram of a dope preparation line.

The explanations about raw materials to be used for preparing a casting dope of the present invention will be made. In the present invention, it is designated to produce a polymer film with a multilayer structure having a main layer and surface layers sandwiching the main layer. Therefore, the casting dope to be prepared includes a first dope for forming a contact layer as the surface layer contacting to a support, a second dope for forming a main layer, and a third dope for forming a exposure layer as the surface layer exposed to an atmosphere.

Independent from the sorts of the casting dope, the polymer to be used in the present invention is preferably a cellulose acylate, and especially a cellulose triacetate (TAC), so as to form a polymer film excellent in transparency. Since the cellulose acylate film has high transparency, it is used as an optical film effectively. It is preferable in the cellulose acylate that the degree of substitution of acyl groups for hydrogen atoms on hydroxyl groups of cellulose preferably satisfies all of following formulae (I)-(III).

$$2.5 \leq A+B \leq 3.0 \quad \text{(I)}$$

$$0 \leq A \leq 3.0 \quad \text{(II)}$$

$$0 \leq B \leq 2.9 \quad \text{(III)}$$

In these formulae (I)-(III), A is the degree of substitution of the acetyl groups for the hydrogen atoms on the hydroxyl groups of cellulose, and B is the degree of substitution of the acyl groups for the hydrogen atoms while each acyl group has carbon atoms whose number is from 3 to 22. Note that at least 90 wt. % of TAC is particles having diameters from 0.1 mm to 4 mm.

A glucose unit constructing cellulose with β-1,4 bond has the free hydroxyl groups on $2^{nd}$, $3^{rd}$ and $6^{th}$ positions. Cellulose acylate is polymer in which, by esterification, the hydrogen atoms on the part or all of the hydroxyl groups are substituted by the acyl groups having at least two carbon atoms. The degree of acylation is the degree of the esterification of the hydroxyl groups on the $2^{nd}$, $3^{rd}$, $6^{th}$ positions. In each hydroxyl group, if the esterification is made at 100%, the degree of acylation is 1. Therefore, if all of the three hydroxyl groups is esterified at 100%, the degree of acylation is 3.

Herein, if the acyl group is substituted for the hydrogen atom on the $2^{nd}$ position in a glucose unit, the degree of the acylation is described as DS2 (the degree of substitution by acylation on the $2^{nd}$ position), and if the acyl group is substituted for the hydrogen atom on the $3^{rd}$ position in the glucose unit, the degree of the acylation is described as DS3 (the degree of substitution by acylation on the $3^{rd}$ position). Further, if the acyl group is substituted for the hydrogen atom on the $6^{th}$ position in the glucose unit, the degree of the acylation is described as DS6 (the degree of substitution by acylation on the $6^{th}$ position). The total of the degree of acylation, DS2+DS3+DS6, is preferably 2.00 to 3.00, particularly 2.22 to 2.90, and especially 2.40 to 2.88. Further, DS6/(DS2+DS3+DS6) is preferably at least 0.28, particularly at least 0.30, and especially 0.31 to 0.34.

In the present invention, the number and sort of the acyl groups in cellulose acylate may be only one or at least two. If there are at least two sorts of acyl groups, one of them is preferable the acetyl group. If the hydrogen atoms on the $2^{nd}$, $3^{rd}$ and $6^{th}$ hydroxyl groups are substituted by the acetyl groups, the total degree of substitution is described as DSA, and if the hydrogen atoms on the $2^{nd}$, $3^{rd}$ and $6^{th}$ hydroxyl groups are substituted by the acyl groups other than acetyl groups, the total degree of substitution is described as DSB. In this case, the value of DSA+DSB is preferably 2.22 to 2.90, especially 2.40 to 2.88.

Further, DSB is preferably at least 0.30, and especially at least 0.7. According to DSB, the percentage of the substitution on the $6^{th}$ position to that on the $2^{nd}$, $3^{rd}$ and $6^{th}$ positions is at least 20%. However, the percentage is preferably at least 25%, particularly at least 30%, and especially at least 33%. Further, DSA+DSB of the $6^{th}$ position of the cellulose acylate is preferably at least 0.75, particularly at least 0.80, and especially at least 0.85. When these sorts of cellulose acylate are used, a solution (or dope) having preferable solubility can be produced, and especially, the solution having preferable solubility to the non-chlorine type organic solvent can be produced. Further, when the above cellulose acylate is used, the produced solution has low viscosity and good filterability.

Cellulose as a raw material of the cellulose acylate may be obtained from one of cotton linter or cotton pulp. However, the cellulose is preferably obtained from the cotton linter, since the optical properties are easily controlled in the film production and the produced film hardly contains the impurities to have high transparency. The film is effective as the optical film.

In cellulose acylate, the acyl group having at least 2 carbon atoms may be aliphatic group or aryl group. Such cellulose acylate is, for example, alkylcarbonyl ester and alkenylcarbonyl ester of cellulose. Further, there are aromatic carbonyl ester, aromatic alkyl carbonyl ester, or the like, and these compounds may have substituents. As preferable examples of the compounds, there are propionyl group, butanoyl group, pentanoyl group, hexanoyl group, octanoyl group, decanoyl group, dodecanoyl group, tridecanoyl group, tetradecanyol group, hexadecanoyl group, octadecanoyl group, iso-butanoyl group, t-butanoyl group, cyclohexanecarbonyl group, oleoyl group, benzoyl group, naphthylcarbonyl group, cinamoyl group and the like. Among them, the particularly preferable groups are propionyl group, butanoyl group, dodecanoyl group, octadecanoyl group, t-butanoyl group, oleoyl group, benzoyl group, naphthylcarbonyl group, cinamoyl group and the like, and the especially preferable groups are propionyl group and butanoyl group.

Further, it is preferable that the solvent for preparing the dope can dissolve the cellulose acylate. For example, there are aromatic hydrocarbons (for example, benzene, toluene and the like), hydrocarbon halides (for example, dichloromethane, chloroform, chlorobenzene and the like), alcohols (for example, methanol, ethanol, n-propanol, n-butanol, diethyleneglycol and the like), ketones (for example, acetone, methylethyl ketone and the like), esters (for example, methyl acetate, ethyl acetate, propyl acetate and the like), ethers (for example, tetrahydrofuran, methylcellosolve and the like) and the like. Note that the dope is a primary dope or a dispersion in which a polymer and the like is dissolved to or dispersed in the solvent.

The solvents are preferably hydrophobic and especially preferably hydrocarbon halides having 1 to 7 carbon atoms, and especially dichloromethane. Then in view of the dissolubility of cellulose acylate, the peelability of a casting film from a support, a mechanical strength of a film, optical properties of the film and the like, it is preferable that one or several sorts of alcohols having 1 to 5 carbon atoms is mixed with dichloromethane. Thereat the content of the alcohols to the entire solvent is preferably in the range of 2 wt. % to 25 wt. %, and particularly in the range of 5 wt. % to 20 wt. %. Concretely, there are methanol, ethanol, n-propanol, iso-propanol, n-butanol and the like. The preferable examples for the alcohols are methanol, ethanol, n-butanol, or a mixture thereof.

By the way, recently in order to reduce the effect to the environment to the minimum, the solvent composition when dichloromethane is not used is progressively considered. In order to achieve this object, ethers having 4 to 12 carbon atoms, ketones having 3 to 12 carbon atoms, esters having 3 to 12 esters are preferable, and a mixture thereof can be used. These ethers, ketones and esters may have the ring structure. Further, the compounds having at least two of functional groups (namely, —O—, —CO— and —COO—) in ethers, ketones and esters can be used for the solvent. Further, the solvent may have other functional groups, such as alcoholic hydroxyl groups, in the chemical structure.

In the above methods, the produced dope has the TAC concentration (wt. %), preferably in the range of 5 wt. % to 40 wt. %, particularly 15 wt. % to 30 wt. %, and especially 17 mass % to 25 wt. %. Note that the dissolution method of the materials, the additives in the solution casting method for forming the TAC film is described in detail from [0517] to [0616] in Japanese Patent Laid-Open Publication No. 2005-104148, and the description of the publication can be applied to the present invention.

Note that the detailed explanation of cellulose acylate is made from [0140] to [0195] in Japanese Patent Laid-Open Publication No. 2005-104148, and the description of this publication can be applied to the present invention.

Then a method for preparing the casting dope will be explained in reference with FIG. 1. It is to be noted that this figure illustrates only an example of the present invention, and therefore the present invention is not restricted in FIG. 1.

As shown in FIG. 1, a dope preparation line 10 includes a solvent tank 11 for storing a solvent therein, a hopper 13 for supplying the TAC, and a mixing tank 15 for obtaining a mixture 17 by mixing the solvent and cellulose acylate. Further, the dope production apparatus 10 is provided with a heating device 22, a temperature controlling device 23, first and second filtration devices 25, 26, a stock tank 28, and a flush device 31. The heating device 22 heats the mixture 17 so as to dissolve the solid materials to the solvent more, and thus a primary dope 20 is obtained from the mixture 17. Thereafter the temperature controlling device 23 controls a temperature of the primary dope 20, and the primary dope 20 is stored in the stock tank 28. Further, in the flush device 31, the concentrating of the primary dope 20 is made. Furthermore, the dope production apparatus 10 includes a recovering device 32 for recovering a vapor of the solvent, and a refining device 33 for recycling the recovered solvent.

Note, the mixing tank 15 has a jacket 35 covering over an outer surface, a first stirrer 38 rotating in accordance with the drive of a motor 37, and a second stirrer 40 rotating in accordance with the drive of a motor 39. The first stirrer 38 preferably has an anchor blade, and the second stirrer 40 is preferably an eccentric stirrer of a dissolver type. The jacket 35 forms a space on the outer surface of the mixing tank 15, and a heat transfer medium is fed into the space. The inner temperature in the mixing tank 15 is controlled with use of the heat transferring medium flowing within the jacket 16a.

The preferable inner temperature is in the range of −10° C. to 55° C. In the mixing tank 15, at least one of the first stirrer 38 and the second stirrer 40 is rotated adequately under the adjustment of the inner temperature.

The mixture 17 is fed to the heating device 22 with use of the pump P1. The heating device 22 is preferably a pipe with a jacket for controlling the temperature. In heating the mixture 17, the dissolution of the swollen solid material in the mixture 17 proceeds. The heating device 22 preferably increase a pressurizing device for pressurizing the mixture 17. The temperature for dissolving in the heating device 22 is preferably in the range of 0° C. to 97° C. Thus the heating is made to increase the solubility effectively without damaging the mixture 17. In the present invention, the heating doesn't mean the heating over the room temperature, but the increase of the temperature of the mixture 17 fed from the mixing tank 15. For example, when the temperature of the fed mixture 17 is −7° C., the heating also means to increase the temperature to 0° C. and so on.

In order to increase the solubility, the cool-dissolution is also preferably made instead of the heat-dissolution with use of the heating device 22. In the cool-dissolution method, the mixture 17 is cooled in the range of −100° C. to −10° C. In this embodiment, one of the heat-dissolution and cool-dissolution methods can be chosen in accordance with the properties of the materials, so as to control the solubility in the mixture 17.

The heated mixture 17 is fed to the temperature controlling device 23, so as to control the temperature nearly to the room temperature. Thus the primary dope 20 in which the polymer is dissolved to the solvent can be obtained. In this embodiment, the mixture 17 out from the temperature controlling device 23 is called the primary dope 20. However, the dissolution of TAC is usually completed through the heating device 22.

The filtration devices 25, 26 are used for trapping undissolved or insoluble materials from the primary dope 20. The filter used in each of the filtration devices 25, 26 preferably has an averaged porous diameter of at most 100 μm. However, if a porous diameter of the filter is too small, it takes long time for the filtration, and therefore also for the dope preparation. If the porous diameter of the filter is too large, it is hard to trap the foreign particles from the primary dope 20. Therefore, it is preferable to choose adequately the porous diameter of the filter in consideration of preparation time. The flow rate of the filtration in each first and second filtration devices 25, 26 is preferably at least 50 little/hr. Thus the dope preparation can proceed without making the preparation time longer.

The stock tank 28 is provided with a jacket 43 for covering an outer face thereof and a stirrer 46 rotated by a motor 45. A heat transfer medium whose temperature is controlled to a predetermined value is fed into a space between the jacket 43 and the outer face of the stock tank 28, similarly to the mixing tank 15. Thus the inner temperature is adjusted. Further, while the primary dope 20 is stored in the stock tank 28, the stirrer 46 is continuously rotated by the motor 45, and the precipitation of the foreign particles occurs in the primary dope 20. Thus the concentration of the dope is kept uniform.

A feed line extending to a downstream side from the stock tank 28 is used for feeding the primary dope 20, and separated into first-third lines L1-L3. In the first line L1 is prepared the first dope for forming the contact layer. In the second line L2 is prepared the second dope for forming the main layer. In the third line L3 is prepared the third dope for forming the exposure layer. Note that another end of each first-third feed lines L1-L3 is connected to a casting die 89 (see, in FIG. 5) provided in a film production line 50. Thus the dope preparation line 10 is connected to the film production line 50 through the first-third feed line L1-L3.

Further, a first tank 52 for storing a first liquid 52a is connected to the first feed line L1, and a first static mixer 53 is provided for the first feed line L1. Similarly, a second tank 55 for storing a second liquid 55a is connected to the second feed line L2, and a second static mixer 56 is provided for the second feed line L2. Further, a third tank 58 for storing a second liquid 58a is connected to the third feed line L3, and a third static mixer 59 is provided for the third feed line L3.

Each device and member is connected by pipes made of stainless, since they are excellent in corrosion resistance and heat resistance. Further, pumps P1-P8 and valves V1, V2 are disposed at suitable positions. However, positions and the numbers of the pumps and the valves are changed adequately, and are not restricted in this embodiment.

In following, a method of producing the primary dope 20 by the dope preparation device will be explained.

At first the valve V1 is opened so as to feed the solvent from the solvent tank 1 to the mixing tank 15. Cellulose acylate to be supplied to the hopper 13 is sent to the mixing tank 15 with the measurement of quantity thereof. Thereafter in the mixing tank 15, the first stirrer 38 and the second stirrer 40 are adequately rotated to mix the several sorts of the raw materials, and thus the mixture 17 is obtained. The inner temperature in the mixing tank 15 is controlled with use of the heat transferring medium flowing within the jacket 35. The preferable inner temperature is in the range of −10° C. to 55° C. The supply of the raw materials into the mixing tank 15 is performed in the order of the solvent and cellulose acylate sequentially. However, the order is not restricted in this embodiment. For example, cellulose acylate and the solvent may be sequentially supplied.

Then the mixture 17 is fed to the heating device 22 with use of the pump P1 while the flow volume is adjusted. Thus, the dissolution of the swollen solid material to the solvent proceeds, while the heating is performed by the heating device 22. In this embodiment, the heating device 22 is a pipe having the jacket for the temperature control and a pressurizing function. Thus the primary dope 20 is heated in the predetermined temperature range, and pressurized, such that the solubility of the solid content to the solvent may be higher.

The mixture 17 is fed to the temperature controlling device 23, so as to control the temperature nearly to the room temperature. Thus the primary dope 20 in which the polymer is dissolved to the solvent can be obtained. The primary dope 20 is filtrated with the first filtration device 25, so as to remove undissolved or insoluble materials. The filter used in the first filtration device 25 preferably has an averaged porous diameter of at most 100 μm. After the filtration, if the primary dope 20 has a predetermined concentration, the primary dope 20 is fed to the stock tank 28 and stored until performance of the casting.

By the way, in the above method in which the mixture 17 is prepared and then the primary dope 20 is obtained from the mixture 17, if it is designated that the primary dope 20 of higher concentration is produced, the time for production becomes longer. Consequently, the production cost sometimes becomes higher. Therefore, it is preferable that the primary dope 20 of the lower concentration than the predetermined value is prepared at first and then the concentrating of the primary dope 20 is made.

As such method, as shown in FIG. 1, the primary dope 20 has the lower concentration than the predetermined value, and after the filtration thereof through the first filtration device 25, the primary dope 20 is sent to the flush device 31 through the valve V2. In the flush device 31, the solvent of the primary dope 20 is partially evaporated. The solvent vapor generated in the evaporation is condensed by a condenser (not shown) to a liquid state, and recovered by the recovering device 32. The recovered solvent is refined and recycled by the refining device 33 and reused. According to this method, the decrease of cost can be designated, since the production efficiency becomes higher and the solvent is reused.

The primary dope 20 after the concentrating as the above description is extracted from the flush device 31 through the pump P2. Then the primary dope 20 is fed to the second filtration device 26, in which the undissolved and insoluble materials are removed. Note that the temperature of the primary dope 20 in the second filtration device 26 is preferably in the range of 0° C. to 200° C. Further, the primary dope 20 is fed to the stock tank 28 and stored. Further, in order to remove bubbles generated in the primary dope 20, it is preferable to perform the bubble removing treatment. As a method for removing the bubble, there are many methods which are already known, for example, an ultrasonic irradiation method and the like.

In the stock tank 28, the stirrer 46 is continuously rotated to stirrer the primary dope 20. Further, a heat transfer medium whose temperature is controlled is fed into the space between the jacket 43 and the stock tank 28, such that the inner temperature of the stock tank 28 may be controlled. Therefore, the temperature of the primary dope 20 stored in the stock tank 28 is also controlled around a predetermined value.

The primary dope 20 prepared by the above method is used for preparing the casting dope. In each first-third feed line L1-L3 for preparing the casting dope, the order and the method of adding a predetermined liquid is the same as those of preparing the primary dope 20. Therefore, in the following explanations, the method of preparing the second dope for forming the main layer in the second feed line L2 is explained, and the methods of preparing the first and third dopes are omitted.

First, a predetermined amount of the primary dope 20 is fed from the stock tank 28 by the pump P5. Then the second liquid 55a is fed out from the second tank 55 by the pump P6 and added to the primary dope 20 fed in the second feed line L2.

The second liquid 55a is a mixture of a solvent and an additive as volatile compound. In the present invention, the volatile compound precipitates on the surface from the inside of the film or the casting film in the drying process, and otherwise is sublimated or evaporated to the atmosphere. The volatile compound is at least one of the retardation controller, the UV absorbing agent and the deterioration inhibitor. The volatile compound has a merit to provide several functions for the film. However, the volatile compound easily evaporates with the solvent, since the bond between molecular is weak and the molecular weight is not large. Further the volatile compound precipitates on the film surface. In the present invention, these problems are resolved since the volatile compound is contained only in the second dope for preparing the main layer. The second liquid 55a may further contain the plasticizer, the peeling improver, and the particles.

Furthermore, in order to make the above effects higher, it is preferable that the percentage of the volatile compound to the solid compounds in the primary dope 20 is in the range of 1 wt. % to 50 wt. %. If the percentage is more than 50 wt. %, the content of the volatile compound is too large, and therefore the volatile compound precipitates on the film surface. If the percentage is less than 1 wt. %, the content of the volatile compound is too small, and it is hard to provide the polymer film with the functions of the volatile compound.

As the UV absorbing agent, there are, for example, benzophenone type compounds, salicylate type compound, and benzotriazole type compounds. In detail, the benzophenone type of the UV absorbing agent is, for example, 2,2'-dihydroxy-4,4'-dimethoxybenzophenone, 2-hydroxy-4-methoxybenzophenone and 2-hydroxy-4-n-dodecyloxybenzophenone. The salicylate type of the UV absorbing agent is, for example, 4-t-butylphenylsalycilate. Further, the benzotriazole type of the UV absorbing agent is, for example, 2-(hydroxyl-5-t-octylphenyl)benzotriazol, 2-(2'-hydroxy-5'-methylphenyl)benzotriazol, and 2-(2'-hydroxy-3,5'-di-t-butylphenyl)-5-chlorobenzotriazol.

As the deterioration inhibitor, there are, for example, epoxy compounds, weak organic acids, saturated polyhydric alcohol, and the like. Further, there are antioxidant of common organic materials, for example, phosphorous acid ester compounds, hindered phenol, sulfer type antioxidant (such as thioether and the like), photostabilizer, metal inactivator, radical inhibitor, peroxide decomposer, secondary amine, tertiary amine and the like.

Figure 2:
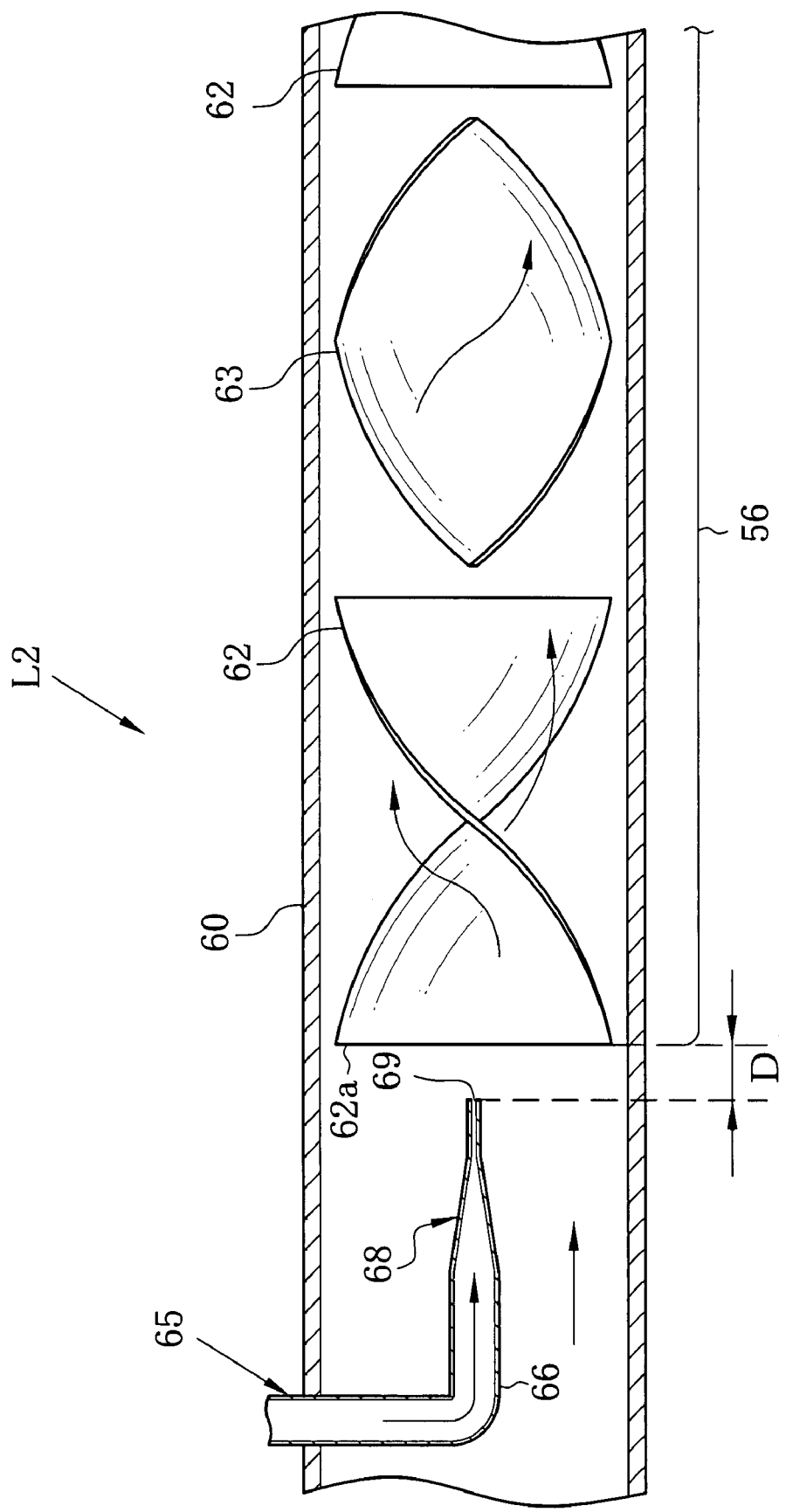
FIG. 2 is an explanatory view of an example of adding an additive to a primary dope with use of a static mixer.

As shown in FIG. 2, the second static mixer 56 is firmly attached with use of screws 64 to a pipe 60 through which the primary dope 20 flows, and thus the primary dope is fed from the pipe into the second static mixer 56. In the second static mixer 56, there are elements 62, 63 which are alternatively arranged in a flowing direction of the primary dope 20. The elements 62, 63 are formed by twisting rectangle plates at 180°, and the twisting direction of the element 62 is opposite to that of element 63. Further, according to the neighboring elements 62, 63, an upstream end of the element 62 forms a right angle with a downstream end of the element 62.

In an upstream side from the second static mixer 56, there is a tube 65 for adding the second liquid 55a. The tube 65 includes a cylindrical main body 66 penetrating a wall of the pipe 60, and a nozzle 68 attached to a downstream end of the tube 65. Further, the nozzle 68 has a slit-shaped outlet 69. A distance D between the tube 65 and the upstream end 62a of the element 62 nearest to the tube 65 is preferably in the range of 1 mm to 250 mm, and particularly in the range of 2 mm to 250 mm. If the distance D is too small, the resistance of the primary dope 20 causes the stop of the nozzle 68, and if the distance D is too large, it is sometimes hard to infuse the volatile compound to a center of the second static mixer 56.

Figure 3:
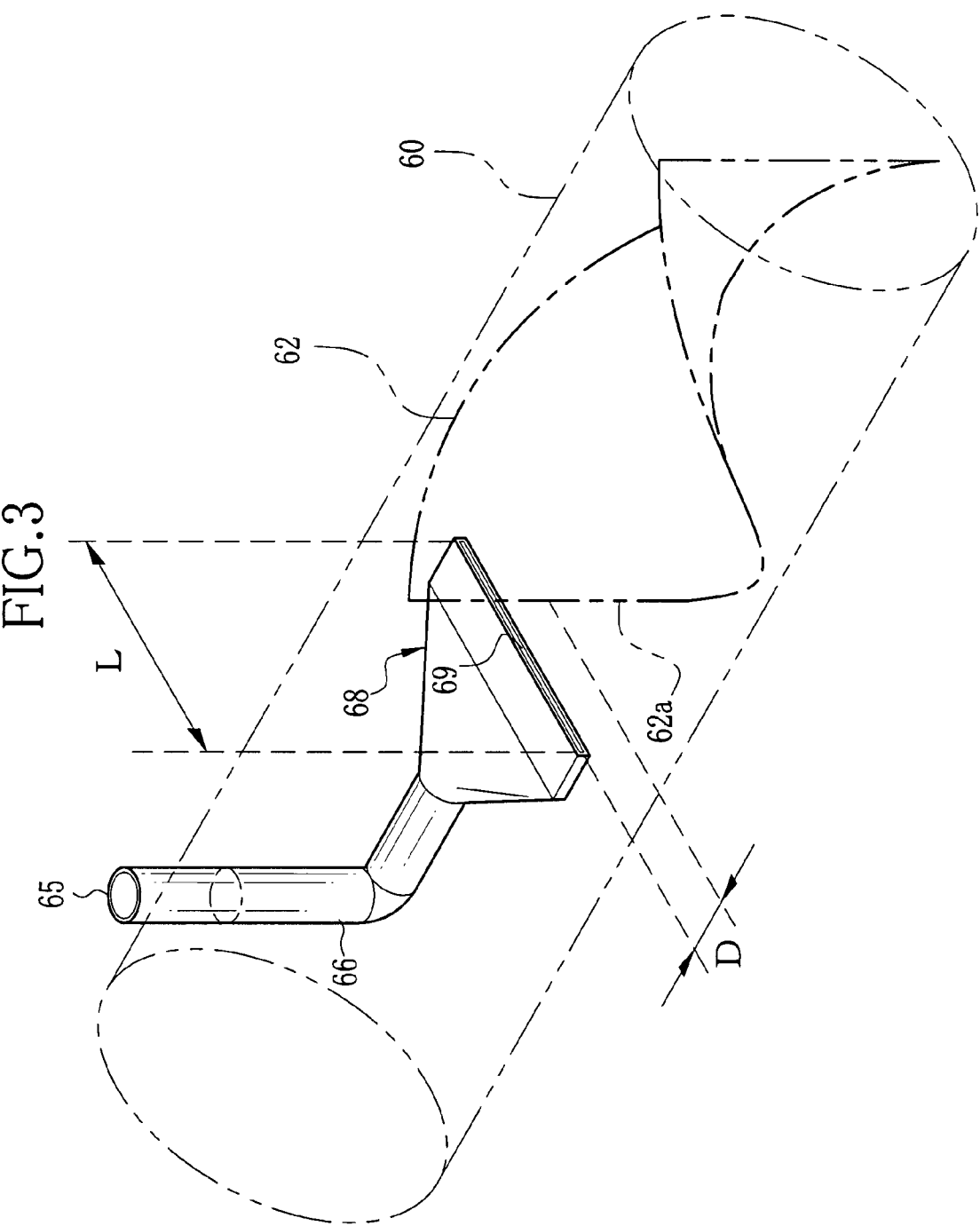
FIG. 3 is a perspective view of a nozzle for adding the additive, illustrating a situation in a pipe in which the primary dope flows.

As shown in FIG. 3, the outlet 69 extends in a diameter direction of the pipe 60 in which the primary dope 20 flows. Further, a lengthwise direction of the nozzle 68 and the outlet 69 is perpendicular to an upstream end 62a of the element 62 which is nearest to the nozzle 68. The second liquid 55a containing the volatile compounds is added through the outlet 69 of the nozzle 68 of the tube 65 to the primary dope 20 flowing in the pipe 60. Thus the primary dope 20 contains the second liquid 55a and flows such that the element 62 may rotates. Herein, the rotation speed of the element 62 will be changed depending on the flow rate of the primary dope 20. In the second static mixer 56, the division of the second liquid 55a is assuredly made from an upstream end of the element 62, and the volatile compound is stably passed without rotation in the pipe 60. Therefore, the mixing of the primary dope 20 and the volatile compound is effectively made. Consequently, the number of elements of the static mixer can be made smaller, and thus the miniaturization of the process and the reduction of the cost can be made. Note that since the static mixer of the same embodiment is also used in the first and third feed lines L1, L3, the additive of the particles and the primary dope 20 can be enough stirred. Thus the uniform dopes can be obtained.

Figure 4:
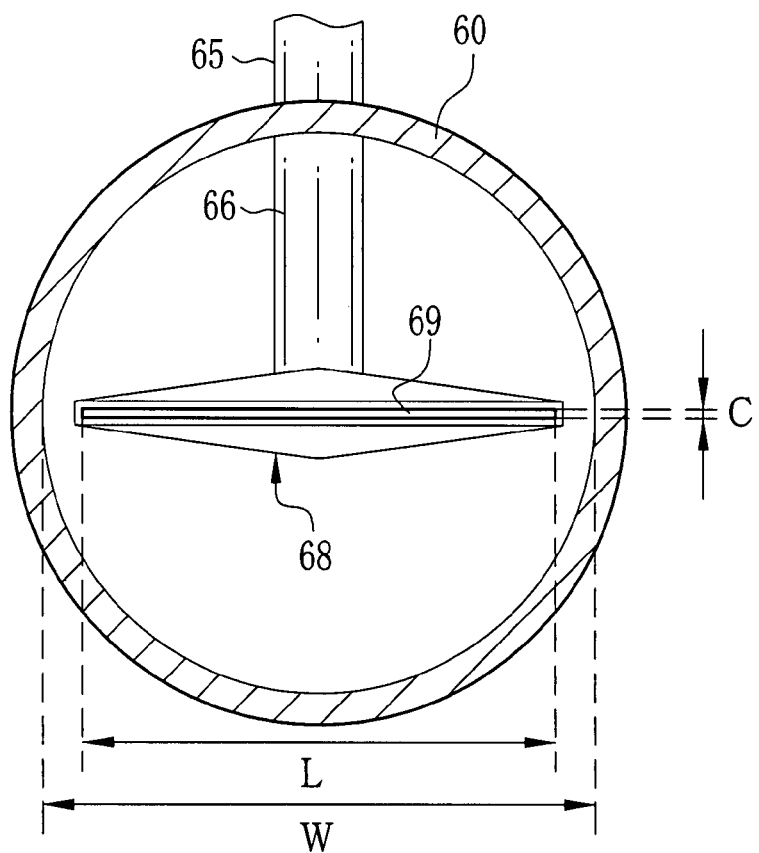
FIG. 4 is a front sectional view of an outlet of the nozzle in the pipe.

As shown in FIG. 4, a length L (mm) of the slit-shaped outlet 69 is preferably in the range of 20% to 80% of an inner diameter W (mm) of the pipe 60. If the length L is less than 20%, the width of the outlet 69 is too small, and therefore the efficiency of stirring is too low. If the length L is more than 80%, part of the second liquid 55a passes through a space between the pipe 60 and the element 62.

Further, a clearance C of the slit-shaped outlet 69 is preferably in the range of 0.1 mm to one tenth of the inner diameter W (mm) of the pipe 60. Thus the volatile compounds can be added to the primary dope efficiently and firmly.

If a current speed of the second liquid 55a flowing in the tube 65 is described as V1 and that of the primary dope flowing in the pipe 60 is described as V2, it is preferable to satisfy a condition, $1 \leq V1/V2 \leq 5$, in order to make the uniform dispersion of the volatile compound in the primary dope 20. The values V1, V2 can be measured by a flow meter disposed in the pipe 60 or the tube 65. If the value V1/V2 is less than one, the second liquid can not be continuously passed into the pipe 60. If the value V1/V2 is more than 5, the current energy of the second liquid 55a is too large, and therefore the second liquid sometimes flows through the second static mixer 56 very fast. Note that the current speed can be measured in accordance with the measured value, while the flow rate is measured by the flow meter.

Further, if a viscosity is N1 (Pa·s) of the second liquid 55a and N2 (Pa·s) of the primary dope 20, it is preferable that the viscosity N1 is in the range of $1 \times 10^{-4}$ Pa·s to $1 \times 10^{-1}$ Pa·s, the viscosity N2 is in the range of 5 Pa·s to $5 \times 10^{2}$ Pa·s, and a ratio N2/N1 satisfies a formula, $1000 \leq N2/N1 \leq 1000000$. Note that the above value is a measured value when the shear rate at 20° C. is 1 ($sec^{-1}$). The viscosity can be measured by the viscometer already known. The viscosity N1 and N2 are not limited in the second liquid 55a, but also applied to the first and third liquids 52a and 58a. In the above range, the viscosity of the additive solution is previously determined, and then the additive as the additive solution is added to the primary dope. Thus the viscosity of the primary dope can be adjusted to a predetermined value.

Furthermore, the shear rate V3 ($sec^{-1}$) of the primary dope 20 flowing in the pipe 60 is preferably in the range of 0.1 ($sec^{-1}$) to 30 ($sec^{-1}$). If the shear rate V3 is less than 0.1 ($sec^{-1}$), the mixing is sometimes not made enough. If the shear rate V3 is more than 30 ($sec^{-1}$), the pressure loss in the pipe 60 becomes too large. In this case, if the withstand pressure of the pipe 60 is 20×9.8N or less, the pipe 60 is sometimes broken. On the basis of the same reason, a Reynolds number showing a situation of current of flux (namely the primary dope 20 in this embodiment) preferably satisfy a formula, $Re \leq 200$.

Consequently, the primary dope 20 after the addition of the second liquid 55a is mixed by the second static mixer 56 to be uniform, and therefore the second dope for forming the main layer becomes uniform.

Similarly, the first dope for forming contact layer is obtained in the first feed line L1 while the pumps P3, P4 are driven to add the first liquid 52a to the primary dope 20, and the third dope for forming the exposure layer is obtained in the third feed line L3 while the pumps P7, P8 are driven to add the third liquid 58a to the primary dope 20. In this case, the first liquid 52a and the third liquid 58a contain other additive compounds than the volatile compound. The first and third liquids 52a, 58a are a liquid in which the additive is mixed to or dispersed in the solvent. The additive is the compound which doesn't volatilize, for example, plasticizer, peeling improver (for example citric acid esters and the like) for making the peeling of a casting film from the casting belt as the support more easily, matting agent (for example silicon dioxide and the like) as particles, and the like. In this embodiment, the first and third liquids 52a and 58a are liquids in which the particles are dispersed. Preferably, in this case, the solvent to be mixed with the additive is the same as at least one of the solvent for the primary dope, such that the casting dope to be obtained may be excellent in compatibility. If the static mixer as in this embodiment is used, the dispersion of the particles is uniformly made, and thus the casting dope is obtained. In this case, since the precipitation of the particles is reduced, it is prevented at the rolling of the film into the film roll that the film surfaces are adhered to each other in the film roll, and the film excellent in the transparency is obtained.

The particles are preferably derivative of silicon dioxide, which contains silicon dioxide and silicone resin having three dimensional network structure. Further, if the alkylation processing as the hydrophobization processing is made on the surface of the particles as the derivatives of the silicone dioxide, the dispersibility to the liquid is high as the solvent of the dope. Therefore, the precipitation of the particles is reduced in the film production. Thus the surface defect is reduced and the transparency is excellent according to the produced film.

Note that the number of carbon atoms in each alkyl group to be provided on the surface of the particles in the alkylation is in the range of 1 to 20, preferably 1 to 12, and especially 1 to 8. If the particles with satisfaction with this conditions are used, the precipitation of the particles is reduced and the dispersibility becomes higher. If the number of the carbon atom in each alkyl group is in the range of 1 to 20, the particles can be obtained by treatment with use of octylsilane. Further, as an example of derivatives of silicon dioxide is aerosol R805 (trade name, Nippon Aerosiy Co. Ltd.) which is sold in the market, which is preferably used in this embodiment.

A content of the particles to the solid content in the primary dope 20 is preferably at most 0.2%. The content of the particles can be adjusted by determining the amount of adding the particles to the solvent used for the primary dope. Thus if the particles are added to the primary dope with control of the content, the generation of the foreign materials caused by the precipitation of the particles is reduced, and therefore the transparency of the film is excellent. Note that the averaged diameter of the particles is preferably at most 1.0 μm, particularly in the range of 0.3 μm to 1.0 μm, and especially 0.4 μm to 0.8 μm.

Note that the Japanese Patent Laid-Open Publication No. 2005-104148, from [0196] to [0516], makes explanations in detail of the volatile controller (such as retardation controller, plasticizers, deterioration inhibitors, UV-absorptive agents, optical anisotropy controllers, dynes), and compounds for preparing the first dope (such as matting agent, release agent, release improver and the like).

A representative example of the plasticizer to be used in the present invention is phosphoric acid ester type plasticizer. For example, there are triphenyl phosphate, biphenyldiphenyl phosphate, tricresyl phosphate, octyldiphenyl phosphate, triethyl phosphate, tributyl phosphate and the like. Further, carboxylic acid ester type plasticizer may be used. For example, there are dimethyl phthalate, diethyl phthalate, dibutyl phthalate, dioctyl phthalate, diethylhexyl phthalate, dimethoxyethyl phthalate, glycerol triacetate, butyl phthalyl butyl glycolate, ethylphthalylethyl glycolate, methylphthalylethyl glycolate and triacetine. Further, phosphoric acid type plasticizer may be used with esters of trimellitic acid or pyromellitic acid. These two ester types have effects of preventing the bleeding-out phenomenon of the phosphoric acid type plasticizer.

In the above embodiment, the static mixer including the elements which are formed by twisting rectangle plates is used as an inline mixer. However, the inline mixer of the present invention is not restricted in this embodiment. For example, a sulzer mixer including an element which is formed by combining plural strip-like plates in a reticular pattern may be used as the inline mixer.

In this embodiment, the volatile compound, the particles, the peeling accelerator and the like are previously added to the liquid such that the first-third liquids to be mixed to the primary dope may be obtained. If some of the additive material is in solid state, the solid material may be fed into each feed line with use of a hopper. Further, if it is designated to add the several sorts of materials described above, the material to be added is previously dissolved to the solvent, and the obtained liquids may be added to the respective feed lines. If some of the additive is in liquid state in the room temperature, the liquid material may be fed into the feed lines without using the solvent. Further, the materials other than the volatile compounds may be added when the primary dope is prepared.

In followings, a method of producing a film with use of the casting dope will be explained in reference with FIG. 5.

Figure 5:
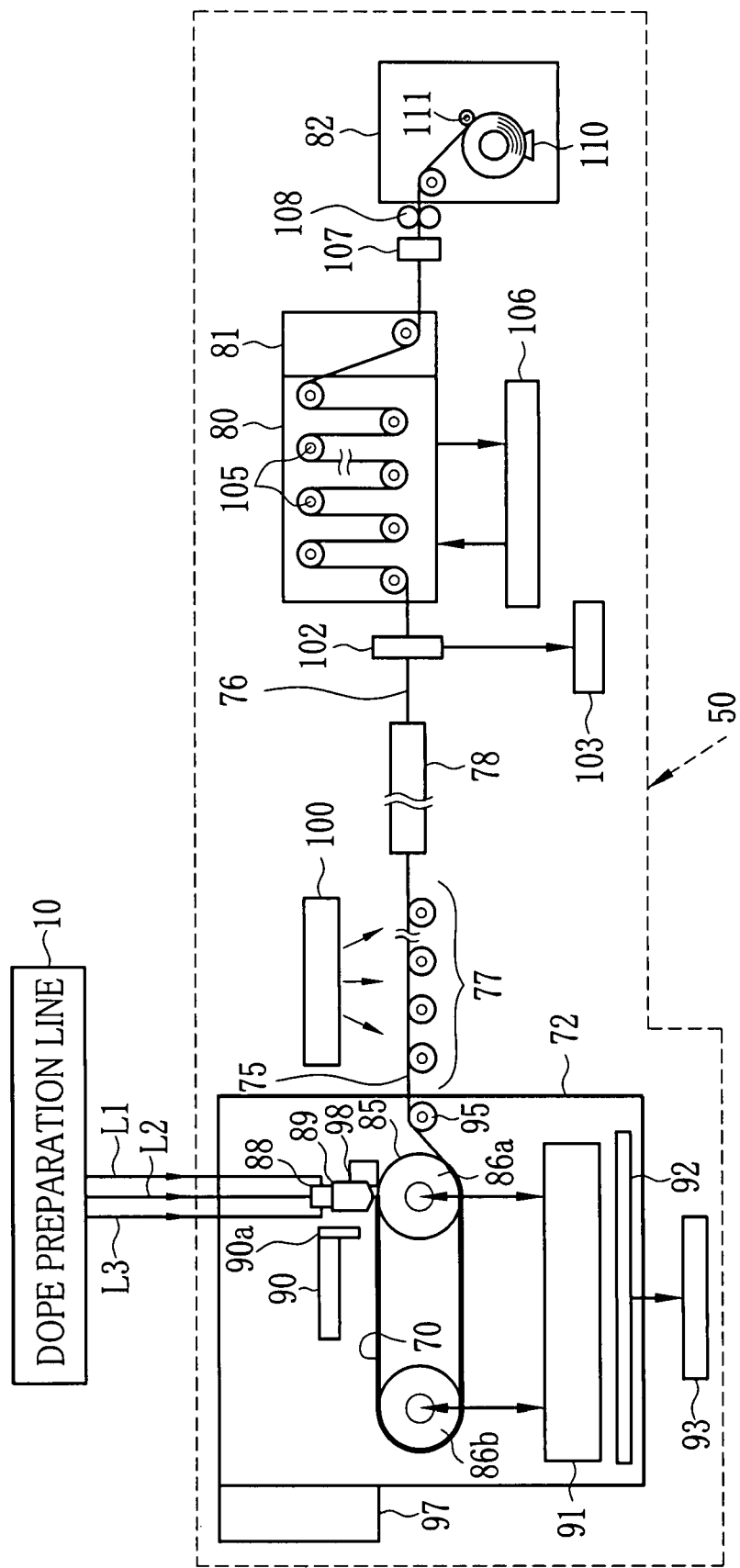
FIG. 5 is a schematic diagram of a film production line of the present invention.

As shown in FIG. 5, a film production line 50 includes a casting chamber 72, a transfer area 77, a tenter device 78, a drying chamber 80, a cooling chamber 81 and a winding chamber 82. In the casting chamber 72, the casting dope is cast onto the support to form a casting film 70. Further the casting film 70 is peeled as a wet film 75 containing a solvent. Then the wet film 75 is transferred in the transfer area 77. Thereafter while the wet film 75 is conveyed in the tenter device 78 with both side edge portions of the wet film 75 kept, the drying of the wet film 75 is made. The wet film 75 is fed out as a film 76 from the tenter device 78. In the drying chamber 80, the film 76 is dried, and in the cooling chamber 81, the film 76 is cooled down. Then the film 76 is wound up in the winding chamber 82.

In the casting chamber 72, there are back-up rollers 86a, 86b and a casting belt 85 supported by the back-up rollers 86a, 86b. Just above the back-up roller 86a, there are a feed block 88 to which the casting dope is supplied from the dope preparation line 10 and a casting die 89 having a slit-like die lip for discharging the casting dope. Further, there are an air blower 90 for feeding a drying air to dry the casting film 70 formed on the casting belt 85, and a heat transfer medium circulator 91 for feeding a heat transfer medium into the back-up rollers 86a, 86b, a condenser 92, a recovering device 93 and a peel roller 95. Outside of the casting chamber 72, there is a temperature controller for controlling an inner temperature of the casting chamber 72.

To the casting die 89 is attached a decompression chamber 98 for make the casting of the casting dope stably. Further, in an upstream side of the air blower 90 according to the running direction of the casting belt 85, an air shielding plate 90a is provided for preventing that the drying air fed out from the air blower causes the nonsmoothness of the surface of the casting film 70.

The back-up rollers 86a, 86b below the casting die 89 are rotated by the driving device (not shown) connected to the back-up roller 86b, and thus the casting belt 85 runs endlessly in accordance with the rotation of the back-up rollers 86a, 86b. Then the casting speed is preferably in the range of 10 m/min to 200 m/min. In this embodiment, passages (not shown) of the heat transfer mediums are formed in the back-up rollers 86a, 86b, and the heat transfer mediums whose temperatures are controlled circulately pass through the passages by the heat transfer medium circulator 91. Thus the surface temperatures of the back-up rollers 86a, 86b are kept to the predetermined values. It is preferable that the surface temperature of the casting belt 85 is adjusted in the range of −20° C. to 40° C. by heat transmission from the back-up rollers 86a, 86b.

The width of the casting belt 85 is not restricted especially. However, it is preferably in the range of 1.1 to 2.0 times larger than a casting width of the discharged casting dope. Further, the casting belt 85 is from 20 m to 200 m in length and 0.5 mm to 2.5 mm in thickness, and the thickness unevenness is at most 0.5%. The surface is preferably polished so as to have a surface roughness at most 0.05 μm. Thus the casting film 70 can be formed without forming scratches on the film surface, and therefore the casting film 70 and the produced film 76 are excellent in planarity. In consideration of the peelability of he casting film 70, endurance and heat resistance, the casting belt 85 is preferably made of stainless, and especially of SUS 316 so as to have enough resistance of corrosion and strength.

The inner temperature of the casting chamber 72 is adjusted by the temperature controlling device 97 so as to be an adequate temperature for drying the casting film 70. In progress of the drying of the casting film 70, the solvent vapor evaporated from the casting film 70 exists in the inside of the casting chamber 72. However, the solvent vapor is liquidized by the condenser 92 and thereafter recovered by the recovering device 93. The recovered solvent is refined and recycled by a refining device (not shown) such that the impurities may be removed. Thus the solvent is recycled for the dope preparation, which decrease the cost for materials and the production cost.

The casting die 89 is preferably a coat hanger type die. A width of the casting die 89 is not restricted especially. However, the width is preferably in the range of 1.05 to 1.5 times as large as the casting width of the casting dope, and in the range of 1.01 to 1.3 times as large as the produced film 76. Further, in order to make the casting of the casting dope smoothly, the surface of the casting die 89 is preferably polished so as to have a surface roughness at most 0.05 μm. Further, the material to be used for the casting die 89 had enough endurance and corrosion resistance, such that the pitting (or pitting corrosion) might not occur on the gas-liquid interface even if this material were dipped in a mixture liquid of dichloromethane, methanol and water for three months. The casting die 89 is preferably made of stainless, and especially of SUS 316 for providing the enough corrosion resistance. However, the materials for the casting die 89 are not restricted especially so far as the corrosion resistance is almost the same as that of SUS 316 in the compulsory corrosion experiment in an electrolyte solution. Further if the casting die 89 is made of the material whose coefficient of thermal expansion is at most $2\times10^{-5}$ (° C.$^{-1}$), the necessary for considering the heat damage is reduced.

The casting die 89 is preferably produced by grinding the materials at least one month after the molding. Thus the casting dope flows smoothly in the casting die 89, and therefore the casting film 70 to be formed is excellent in the planarity without occurrence of streaks. However, in order to increase the above effects, it is preferable that the finish accuracy of the contact surface of each casting die to the casting dope is at most 1 μm in surface roughness, the straightness is at most 1 μm/m in any direction and the slit clearance is adjustable in the rage of 0.5 mm to 3.5 mm. According to an edge of the contact portion of a lip end of the casting die 89, R is at most 50 μm in all of a width. Further, the shearing rate in the casting die 89 controlled in the range of one to 5000 per second.

It is preferable to attach a temperature controller (not shown) to the casting die 89, such that the temperature may be kept to the predetermined one during the film production. Further, the casting die 89 is preferably a coat hanger type die. The thickness of the casting film is often controlled by adjusting a feed rate of the feed pump from the casting die 89. Further, in order to adjust a thickness profile in a widthwise direction of the casting film, the casting die 89 is preferably provided with an automatic thickness adjusting device. For example, it is preferable that thickness adjusting bolts (heat bolts) for controlling a lip clearance are disposed as the automatic thickness adjusting instrument at a predetermined interval in a widthwise direction of the casting die 89. Note that the film thickness is defined in consideration with a change of the thickness and the smoothness in the widthwise direction. Further, according to the heat bolts, it is preferable that the profile is set on the basis of a predetermined program, depending on feed rate of a pump (not shown). Further, the feed back control of the adjustment value of the heat bolts may be made by the adjusting program on the base of the profile of a thickness gauge (not shown), such as infrared ray thickness gauge and the like. Preferably, the thickness difference between any two points in the widthwise direction except the side edge portions in the casing film is preferably at most 1 μm, and the thickness difference in the widthwise direction is at most 3 μm. Further, the accuracy to the designated object value of the thickness is preferably in ±1.5 μm.

Preferably, a hardened layer is preferably formed on a top of the lip end. A method of forming the hardened layer is not restricted. But it is, for example, ceramics hard coating, hard chrome plating, neutralization processing, and the like. If ceramics is used as the hardened layer, it is preferable that the used ceramics is grindable but not friable, with a lower porosity. Further preferably, the ceramics have low wetting property. Concretely, there are tungsten carbide (WC), $Al_2O_3$, TiN, $Cr_2O_3$, and the like. Especially preferable ceramics is tungsten carbide. Tungsten carbide coating can be made by an spraying method.

Further, in order to prevent the partial dry-solidifying of a dope on a slit end of the casting die 89, it is preferable to provide a solvent supplying device (not shown) at the slit end, on which a gas-liquid interfaces are formed between both edges of the slit and both bead edges and the outer gas. Preferably, these gas-liquid interfaces are supplied with the solvent which can dissolve the dope, (for example a mixture solvent of dichloromethane 86.5 pts. wt., methanol 13 pts. wt., n-butanol 0.5 pts. wt.). The solvent is preferably supplied to each edges of the bead from 0.1 mL/min to 1.0 mL/min. Thus the solidifications at both bead edges and the mixing of the solid into the casting film are prevented. Note that the pump for supplying the solvent has a pulse rate at most 5%.

Further, it is necessary during the casting of the casting dope to stabilize the formation of a bead of the discharged casting dope between the casting die 89 and the casting belt 85, in order to produce the film 76 excellent in optical properties. Therefore, it is preferable to provide the decompression chamber 98 for controlling the pressure in the upstream side from the bead. When the pressure in the upstream side from the bead is adjusted by the decompression, it is prevented that the wave-like unevenness is formed on the surface of the bead in effect of the wind in the atmosphere. The pressure in the upstream side from the bead is not restricted especially. However, in order to produce the casting film 70 excellent in the planarity, the pressure is preferably in the range of 10 Pa to 2000 Pa lower than the atmospheric pressure.

In the transfer area 77, there are a plurality of rollers and an air blower 100 for feeding out to the wet film 75 a drying air whose temperature is adjusted so as to make the drying faster. Further, the tenter device 78 includes a chain (not shown) running on a rail (not shown), clips (not shown) attached on the chain, and a dryer (not shown). In the downstream from the tenter device 78, an edge slitting device for slitting both side edge portions of the film 76 is disposed.

In the drying chamber 80, there are a plurality of rollers and an adsorbing device 106. Further, the drying chamber 80 is provided with a temperature controlling device (not shown) for controlling the inner temperature. In the cooling chamber 81, the film 76 is cooled down to around the room temperature. Thereafter, a compulsory neutralization device (or a neutralization bar) 107 eliminates the charged electrostatic potential of the film 76 to the predetermined value. After the neutralization, a knurling roller 108 provides the knurling on the film 76, so as to smooth the wrinkle. Therefore the planarity of the film 76 becomes excellent. Further, in the winding chamber, a winding shaft 110 and a press roller 111 are provided.

In following, the order of producing the film 76 in the film production line 50 will be explained.

First, the second dope for forming the main layer, the first dope for forming the contact layer, and the third dope for forming the exposure layer are respectively fed through the first-third feed line L1-L3 to the feed block 88, while the feed amount of the first-third dopes is controlled adequately. In the feed block 88, there are passages for the first-third dopes in the predetermined positions, and the first-third dopes are joined into the casting dope. Thereafter, the casting dope is fed to the casting die 89.

Figure 6:
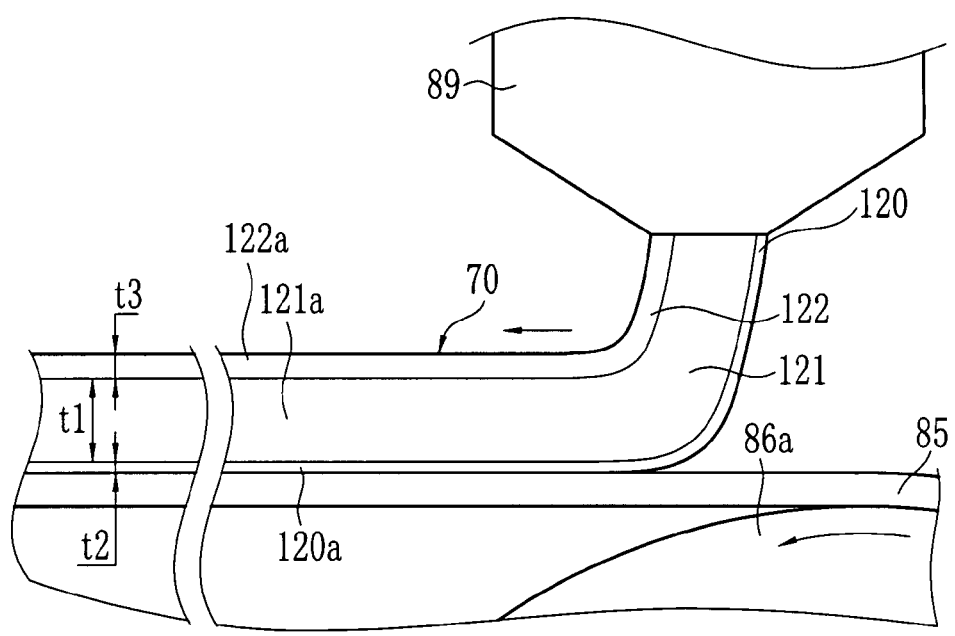
FIG. 6 is a schematic diagram illustrating a situation of the casting of a casting dope from a die in the film production line.

In FIG. 6, the numerals of the first-third dopes constructing the casting dope are respectively 120, 121 and 122. The casting dope is cast onto the casting belt 85 so as to form the casting film 70. The first-third dopes 120-122 form the contact layer, the main layer and the exposure layer whose numerals are 120a, 121a and 122a.

In the solution casting method of the present invention, there are casting methods for casting plural dopes, for example, a co-casting method and a sequential casting method. In this embodiment, the co-casting method is performed. Further, in the present invention, the co-casting method and the sequential casting method may be combined. In the sequential casting method, plural dopes are cast sequentially. When it is designate to perform the sequential casting method, a plurality of the casting dies is used, and the casting die for discharging the first dope for forming the contact layer is disposed in the most upstream position among the casting dies. Then the casting die for discharging the second dope for forming the main layer is disposed downstream from the die to the first dope and next to the casting die for forming the contact layer, and the casting die for discharging the third dope for forming the exposure layer is disposed the most downstream position. Thus the casting film has a multi-layer structure. Further, the feed block 88 may be attached to the casting die 89, and otherwise the casting die may be a manifold type. When it is designated to form the film 76 with multi-layer structure by the co-casting, at least one of the thickness of the peeled layer from the support and that of the opposite layer thereto is preferably in the range of 0.5% to 30% of the total film thickness.

In the casting chamber 72, the air blower 90 has an outlet (not shown). The outlet is directed in the running direction of the casting belt 85 (or the conveying direction of the casting film). The drying air whose temperature is controlled is fed out from the outlet in parallel to the conveying direction, it is prevented to form the unevenness on the film surface of he casting film 70. Further, the solvent vapor evaporated from the casting film 70 is liquidized by the condenser 92, and thereafter recovered by the recovering device 93. The recovered solvent is refined and recycled by the refining device (not shown) and reused as the solvent for the dope preparation.

When the casting film 70 has self-supporting property, it is peeled as the wet film 75 from the casting belt 85 with support of the peel roller 95. The content of remaining solvent in the wet film 75 just after the peeling is preferably in the range of 10 mass % to 200 mass %. Thereafter, the wet film 75 is transported through the transfer area 77 provided with many rollers. In the transfer area 77, while the wet film 75 is transferred with support of the rollers, the drying air is fed out from the air blower 100 such that the drying of the wet film 75 may be made. The temperature of the drying air from the air blower 100 is preferably controlled in the range of 20° C. to 250° C. The temperature of the drying air may be determined optionally in consideration of the sorts of polymer, additives and the like used for the casting dope, the production speed and the like.

Note that the content of the remaining solvent is that on dry basis and measured with use of the samples of the casting film 70 and the produced film which is completely dried. If the sample weight of the casting film 70 was x and the sample weight after the drying was y, the solvent content on the dry basis (%) was calculated in the formula, $\{(x-y)/y\} \times 100$.

In the transfer area 77, the rotation speed in the downstream side of the wet film 75, namely near the exit of the transfer area 77, is preferably faster than that in the upstream side. Thus the adequate tension is applied to the wet film 75 to reduce the wrinkles and the creases. Further, the tension is applied to the wet film 75 in which the content of remaining is high, such that the molecular orientation is easily controlled. Therefore, the retardation of the film is easily controlled.

Furthermore, the wet film 75 is fed into the tenter device 78. In the tenter device 78, both side edge portions of the wet film 75 are clipped by the clips (not shown), and then transported. During the transportation, the drying air is fed from a drying device (not shown), such that the wet film 75 is dried moreover. Thereafter the wet film 75 is fed out as the film 76 from the tenter device 78. Further, it is preferable in the tenter device 78, the stretch of the transported wet film 75 in the widthwise direction is made such that the retardation value of the obtained film 76 may be controlled to the predetermined value. Further, the inside of the tenter device 78 is preferably partitioned into plural partitions whose temperatures are independently controlled. Thus in the transfer of the wet film 75, the wet film 75 is gradually dried at the different temperatures, which reduces the sudden evaporation of the solvent and therefore the deformation of the film. Consequently the produced film is excellent in the planarity. Note that the tenter device 78 of this embodiment is the clipping type having a plurality of clips as clipping members. However, instead of the clips, pins may be provided in the tenter device 78. In this case, the pins are stroked into the both side edge portions of the wet film 75, and thereafter the stretching of the wet film 75 in the widthwise direction is made.

The stretch and the relaxation of the wet film 75 in the lengthwise direction is made in the transfer area 77, and that in the widthwise direction is made in the tenter device 78. In these cases, the stretch ratio as percentage of difference of the film length or the film width between after and before the stretch is in the range of 0.5% to 300%. Note that while the tension is applied to the wet film 75 in the transfer area 77 or the tenter device 78, the drying temperature is preferably kept almost constant. Thus it is prevented that the temperature difference causes the difference of the stretch ratio.

The wet film 75 is fed out as the film 76 from the tenter device 78 toward an edge slitting device 102 for slitting off both side edge portions which has been damaged in the tenter device 78. The slit side edge portions are sent to a crusher 103 by a cutter blower (not shown), and crushed to tips by the crusher 103. The tips are reused for preparing the dope, which is effective in view of the decrease of the production cost. Thus the both side edge portions which are damaged by the clipping in the tenter device 78 can be removed, and therefore the produced film 76 is excellent in planarity. Note that the slitting process of both side edge portions may be omitted. However, it is preferable to perform the slitting between the casting process and the winding process.

The film 76 whose side edge portions are slit off is sent to the drying chamber 80 and dried furthermore therein. In the drying chamber 80, the film 76 is transported with lapping on the rollers 104. The inner temperature of the drying chamber 80 is not restricted especially. However, it is preferably controlled such that the temperature near the film surface of the film 76 may be in the range of 60° C. to 145° C. Thus the heat damage of the polymer in the film 76 is prevented and the evaporation of the solvent is effectively made. The temperature of the film surface can be measured by a thermometer provided above the transport path of the film 76. Further, in this embodiment, the solvent vapor evaporated from the film 76 by the drying chamber 80 is adsorbed and recovered by the adsorbing device 106. In the adsorbing device, the solvent vapor is removed from the air, which is reused as the drying air in the drying chamber 80. Thus the energy cost and therefore the production cost are decreased.

If the temperature of the film 76 increases suddenly, the form of the film 76 changes. Therefore, a pre-drying chamber (not shown) may be provided for the pre-drying of the film 76 between the edge slitting device 102 and the drying chamber 80. Thus the sudden increase of the temperature of the film 76 is prevented.

The film 76 is transported into the cooling chamber 81, and cooled therein to around the room temperature. A humidity control chamber (not shown) may be provided for conditioning the humidity between the drying device 80 and the cooling chamber 81. Thus the film 76 is set after the conditioning the humidity thereof into the cooling chamber 81. Therefore the wrinkles on the film surface are reduced.

Thereafter, a compulsory neutralization device (or a neutralization bar) 107 eliminates the charged electrostatic potential of the film 76 to the predetermined value (for example, in the range of −3 kV to +3 kV). The position of the neutralization process is not restricted in this embodiment. After the neutralization, the embossing of both side portions of the film 76 is made by the embossing rollers to provide the knurling. If the emboss is provided, the planarity of the film 76 becomes larger.

In the last process, the film 76 is wound by the winding shaft 110 in the winding chamber 82. At this moment, a tension is applied at the predetermined value toward a central direction by the press roller 111. In order to wind the film 76 without the occurrence of the wrinkle and the crease, it is preferable that the tension is gradually changed from the start to the end of the winding. In the present invention, the length of the polymer film 76 is preferably at least 100 m. The width of the film is preferably in the range of 1400 mm to 2500 mm. Further, even if the width is more than 2500 mm, the present invention is effective.

The thickness of the produced film 76 is preferably in the range of 20 μm to 100 μm, particularly in the range of 20 μm to 80 μm, and especially in the range of 30 μm to 70 μm. However, the present invention is not restricted in the above values of the thickness. Namely, when it is designated to produce a thin film whose thickness is in the range of 15 μm to 100 μm, the present invention is effective.

In the present invention, the film is constructed of the main layer and the surface layers sandwiching the main layer, and only the main layer contains the volatile compounds such as the plasticizer, the UV absorbing agent and the like that cause the bleeding-out phenomenon. Therefore, when many hours pass after the film production, it is prevented that the volatile compounds precipitates on the film surface. Further, in the film production, when the drying of the casting film, wet film and the film, not only the evaporation of the solvent but also that of the volatile compounds are prevented. Thus the produced film has enough effects of the volatile compound.

Figure 7:
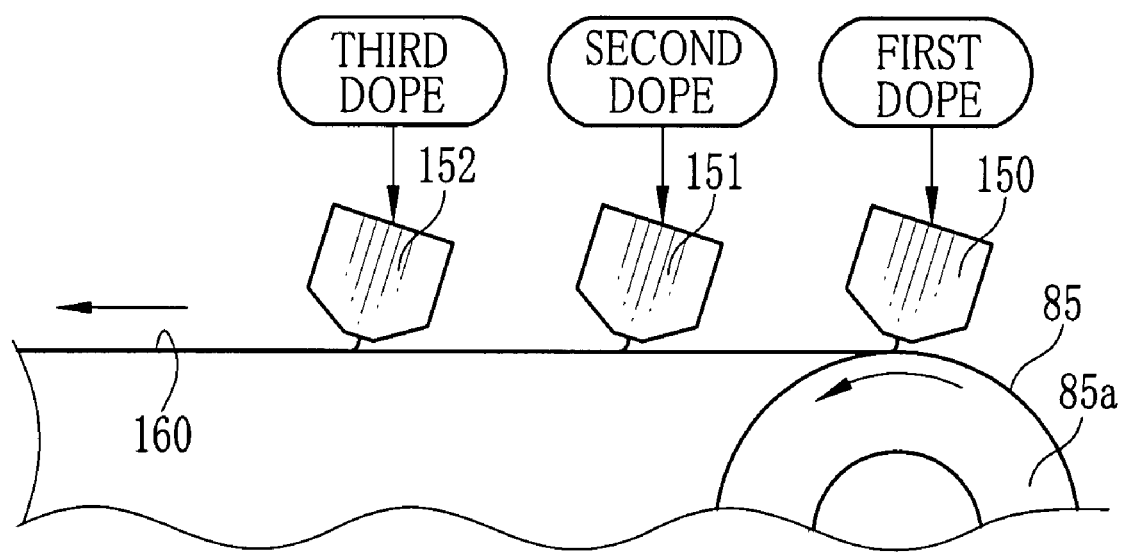
FIG. 7 is a schematic diagram of an embodiment of a sequential casting method according to the present invention.

In the solution casting method of the present invention, there are casting methods for casting plural dopes, for example, a co-casting method and a sequential casting method. In this embodiment, the co-casting method is performed. In the sequential casting method, as shown in FIG. 7, plural dopes are cast from casting dies 150-152 sequentially. The casting die 150 is disposed in the most upstream position from the other casting dies 151, 152, and discharges the first dope for forming the contact layer. Then the casting die 151 is disposed downstream from and next to the casting die 150, and discharges the second dope for forming the main layer. The casting die 152 is disposed the most downstream position, and discharges the third dope for forming the exposure layer. Thus the casting film 160 has a three layer structure. Further, in the present invention, the co-casting method and the sequential casting method may be combined. Further, the feed block may be attached to at least one of the casting dies 150-152, and otherwise the casting die may be a multi-manifold type. In the case of forming the film of the multi-layer structure by the co-casting, each of the thickness of an exposure layer to the atmosphere and that of the contact layer to the casting belt 85 is in the range of 0.5% to 30% to the film thickness. Note that the same numbers are applied to the same portions to the film production line 50, and the explanations thereof are omitted.

The structure of the casting die, the casting chamber and the support, the co-casting, the peeling, the stretch, the drying conditions in each process, the handling, the curling, the winding method after the correction of the planarity and the recovering of the solvent and the film are described from [0617] to [0889] in the Japanese Patent Laid-Open Publications No. 2005-104148.

[Properties & Measuring Method]
(Degree of Curl & Thickness)

Japanese Patent Laid-Open Publication No. 2005-104148 describes from [1073] to [1087] about the properties of the wound cellulose acylate film and the measuring method thereof. The properties and the measuring methods can be applied to the present invention.

[Surface Treatment]

The cellulose acylate film is preferably used in several ways after the surface treatment of at least one surface. The preferable surface treatments are vacuum glow discharge, plasma discharge under the atmospheric pressure, UV-light irradiation, corona discharge, flame treatment, acid treatment and alkali treatment. Further it is preferable to make one of these sorts of the surface treatments.

[Functional Layer]

(Antistatic, Hardened, Antireflection, Easily Adhesive & Antiglare Layers)

The cellulose acylate film may be provided with an undercoating layer on at least one of the surfaces, and used in the several ways.

It is preferable to use the cellulose acylate film as a base film to which at least one of functional layers may be provided. The preferable functional layers are an antistatic layer, a cured resin layer, an antireflection layer, an easily adhesive layer, an antiglare layer and an optical compensation layer.

These functional layers preferably contain at least one sort of the surfactants in the range of 0.1 mg/m$^2$ to 1000 mg/m$^2$. Further, the functional layers preferably contain at least one sort of the lubricants in the range of 0.1 mg/m$^2$ to 1000 mg/m$^2$. Furthermore, the functional layers preferably contain at least one sort of the matting agent in the range of 0.1 mg/m$^2$ to 1000 mg/m$^2$. Furthermore, the functional layers preferably contain at least one sort of the antistatic agent in the range of 1 mg/m$^2$ to 1000 mg/m$^2$. Conditions and Methods for forming the functional layer are described in detail from [0890] to [1087] of Japanese Patent Laid-Open Publication No. 2005-104148, which can be applied to the present invention. Thus the produced film can have several functions and properties.

(Variety of Use)

The produced cellulose acylate film can be effectively used as a protection film for a polarizing filter, and an optical compensation film. In the polarizing filter, the cellulose acylate film is adhered to a polarizer. Usually, two polarizing filters are adhered to a liquid crystal layer such that the liquid crystal display may be produced. Note that the arrangement of the liquid crystal layer and the polarizing filters are not restricted in it, and several arrangements already known are possible. Japanese Patent Laid-Open Publication No. 2005-104148 discloses the liquid crystal displays of TN type, STN type, VA type, OCB type, reflective type, and other types in detail. Further, in the description of this application, a cellulose acylate film is provided with an optically anisotropic layer, and another cellulose acylate film is provided with antireflective and antiglare functions. Further, the publication describes about the optically biaxial cellulose acylate film provided with adequate optical properties. This cellulose acylate film may be used with the protective film for the polarizing filter. These descriptions of the publication No. 2005-104148 continues from [1088] to [1265] which can be applied to the present invention.

EXAMPLE 1

The following compounds are mixed such that the primary dope 20 may be produced by the dope preparation line 10 shown in FIG. 1. In this example, not only the solvent tank 11 but also a methanol tank (not shown) for storing a methanol is prepared. It is to be noted in this embodiment that the solvent components stored in the solvent tank 11 is dimethyl methane as a first solvent component and the alcohol in the alcohol tank is uses as a second solvent component.

Thus the following compounds are used in this embodiment:

| | |
|---|---|
| Cellulose Triacetate | 100 pts. wt. |
| (Powder: degree of substitution, 2.94; viscosity-average degree of polymerization, 305; viscosity of 6 mass % dichloromethane solution, 350 mPa · s) | |
| Dichloromethane (first solvent component) | 390 pts. wt. |
| Methanol (second solvent component) | 60 pts. wt. |

First, an adequate amount of the dichloromethane was fed from the solvent tank 11 to the mixing tank 15, and an adequate amount of the methanol was fed from the methanol tank to the mixing tank 15. Then the cellulose triacetate was fed from the hopper 13 to the mixing tank 15. The stirring of the cellulose triacetate was made in the mixing tank 15, such that the mixture 17 might be obtained. Then the mixture 17 was fed to the heating device 22 in which the cellulose triacetate was dissolved to the solvent, and cooled about to the room temperature by the temperature controlling device 23, such that the primary before the concentration dope might be obtained. The primary dope was fed to the flush device 31, in which the evaporation of the solvent was performed. Thus the primary dope 20 of the predetermined concentration was obtained.

The concentrated primary dope 20 was extracted from the flush device 31 by the pump P2, and the defoaming was performed by irradiating very weak ultrasonic waves. Thus the filtration was made by the second filtration device 26 such that the impurity might be trapped. Then the primary dope 20 was fed to the stock tank 28.

Then part of the primary dope was fed into the second feed line L2. Then the pump P6 was driven to feed the second liquid 55a from the second tank 55 to the second feed line L2. The primary dope 20 and the second liquid 55a are mixed and stirred by the second static mixer 56. Thus the second dope for forming the main layer is prepared. In the preparation, the second liquid 55a was a mixture of the following compounds with a mixture in which the primary dope and the mixture solvent are previously mixed. In Example 1, the content of the volatile compound in the first dope for the contact layer was 2.5 wt. %. It is to be noted in the following that the retardation decreasing agent is a retardation controller for decreasing the retardation, and the retardation decreasing agent and the controller of wavelength dispersion are volatile compounds.

| | |
|---|---|
| Retardation Decreasing Agent of CF-I | 12 pts. wt. |
| Controller of Wavelength Dispersion of CF-II | 1.8 pts. wt. |
| Particles | 0.05 pts. wt. |
| (silicon dioxide, particle diameter, 15 nm; Mohs Hardness, about 7) | |

CF-1

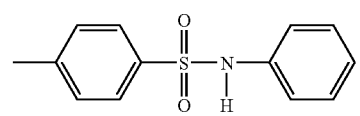

-continued

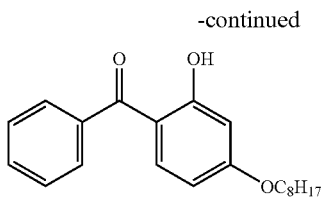

CF-2

In the first and third feed lines L1, L3, the first dope for forming the contact layer and the third dope for forming the exposure layer are prepared. In this case, the first liquid 52a and the third liquid 58a are a dispersion containing 0.05 pts. wt. of the particles (silicon dioxide, particle diameter, 15 nm; Mohs Hardness, about 7), while the particles were previously dispersed in the solvent for the dope preparation.

As shown in FIG. 6, the second dope 121 for the main layer 121a, the second dope 120 for the contact layer 120a and the third dope 122 for the exposure layer 122a were used for producing the film 76 in the film production line 50. First, the co-casting of the first-third dopes 120-122 from the casting die 89 onto the casting belt 85 was made so as to form the casting film 70 having a three layer structure of the main layer 121a, the contact layer 120a and the exposure layer 122a. Then the casting film 70 was peeled as the wet film 75 from the casting belt 85, and dried in the transfer area 77 and the tenter device 78. Thus the film 76 was obtained. Thereafter, the film 76 was fed into the drying chamber 80 in which the film 76 was lapped on many rollers 105. In the drying chamber 80, while the film 76 was transported, the drying thereof was made enough. At last, the film 76 was wound up around the winding shaft 110 in the winding chamber 82. According to the product film 76, the content of remaining solvent was 0.4 wt. %, and the thickness was 80μm.

The observation of the film 76 was made with eyes, and the precipitation of the volatile compound was not recognized.

EXAMPLE 2

In Example 2, the film 76 was produced with use of the same materials and the same production method as Example 1. However, in Example 2, although the volatile compounds are contained in the main layer, the outlet of the nozzle was not slit but circle. The surface of the film 76 was observed with eyes, and the precipitation of the volatile compound was more slightly recognized as the bleeding out phenomena than Example 1.

[Comparison 1]

In Comparison 1, instead of the third liquid 58a, the second liquid 55a containing the volatile compound was fed into the third feed line L3, and mixed with the primary dope 20. Thus the third dope for forming the exposure layer was obtained. The content of the volatile compound in the first dope for the contact layer was 2.5 wt. %. The outlet of the nozzle was not slit but circle, and the second dope for forming the main layer was the same as Example 1. The surface of the film 76 was observed with eyes, and the precipitation of the volatile compound was recognized so much, and the film 76 could not used as the film product.

[Comparison 2]

In Comparison 2, instead of the first liquid 58a, the second liquid 55a containing the volatile compound was fed into the first feed line L1, and mixed with the primary dope 20. Thus the first dope for forming the contact layer was obtained. The outlet of the nozzle was not slit but circle, and the second dope for forming the main layer was the same as Example 1. The surface of the film 76 was observed with eyes, and the precipitation of the volatile compound was recognized so much, and the film 76 could not used as the film product.

As the result of the above examples and comparisons, the volatile compounds, namely the additive materials having provability of precipitation on the film surface is contained only in the second dope for the main layer, and the produced polymer film has the multi-layer structure having the main layer and the surface layers sandwiching the main layer. On the film surface, the precipitation of the additives is reduced.

Various changes and modifications are possible in the present invention and may be understood to be within the present invention.

What is claimed is:

1. A production method of a polymer film having exposed surface layers and an intermittent layer between said surface layer, comprising steps of:
   mixing a polymer and an organic solvent so as to prepare a primary dope;
   adding to said primary dope additives to be contained in said polymer film, such that a casting dope for forming said surface layers and a casting dope for forming said intermittent layer may be obtained;
   casting on a support said casting dopes such that said casting dopes may be stacked to form a casting layer;
   peeling from said support said casting film as a wet film containing said organic solvent; and
   drying said wet film such that said polymer film may be obtained,
   wherein only said additive added to said casting dope for said intermittent layer contains volatile compounds.

2. A production method described in claim 1, wherein said volatile compound is one of a retardation controller, a UV absorbing agent and a deterioration inhibitor.

3. A production method described in claim 1,
   wherein said primary dope is fed in a pipe,
   wherein said additive is added to said primary dope through a tube connecting to said pipe; and
   wherein said primary dope and said additive are mixed by a static mixer provided in said pipe.

4. A production method described in claim 3, wherein said tube includes a slit as outlet extending in an inner diameter direction of said pipe.

5. A production method described in claim 4, wherein a length of said slit is in the range of 20% to 80% of an inner diameter of said pipe.

6. A production method described in claim 4, wherein a clearance C of said slit is at least 0.1 mm and at most one tenth of an inner diameter of said pipe.

7. A production method described in claim 4, wherein a distance D from said slit to said inline mixer is in the range of 1 mm to 250 mm.

8. A production method described in claim 4, wherein a current speed V1 of said additive flowing in said tube and a current speed V2 of said primary dope flowing in said pipe satisfy a condition, $1 \leq V1/V2 \leq 5$.

9. A production method described in claim 1, wherein said casting is a co-casting or a sequential casting.

* * * * *